Feb. 15, 1949. R. GUNN 2,461,543
APPARATUS AND METHOD FOR STUDYING WAVE PROPAGATIONS
Filed Feb. 1, 1941 3 Sheets—Sheet 1
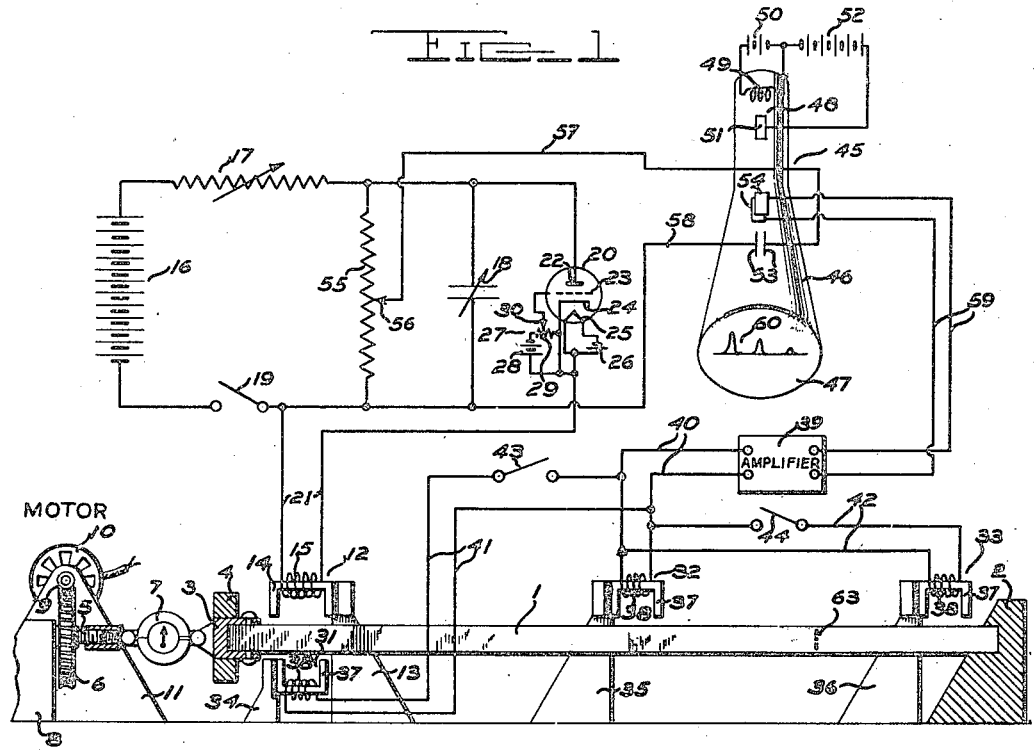
INVENTOR
Ross Gunn
BY
ATTORNEY

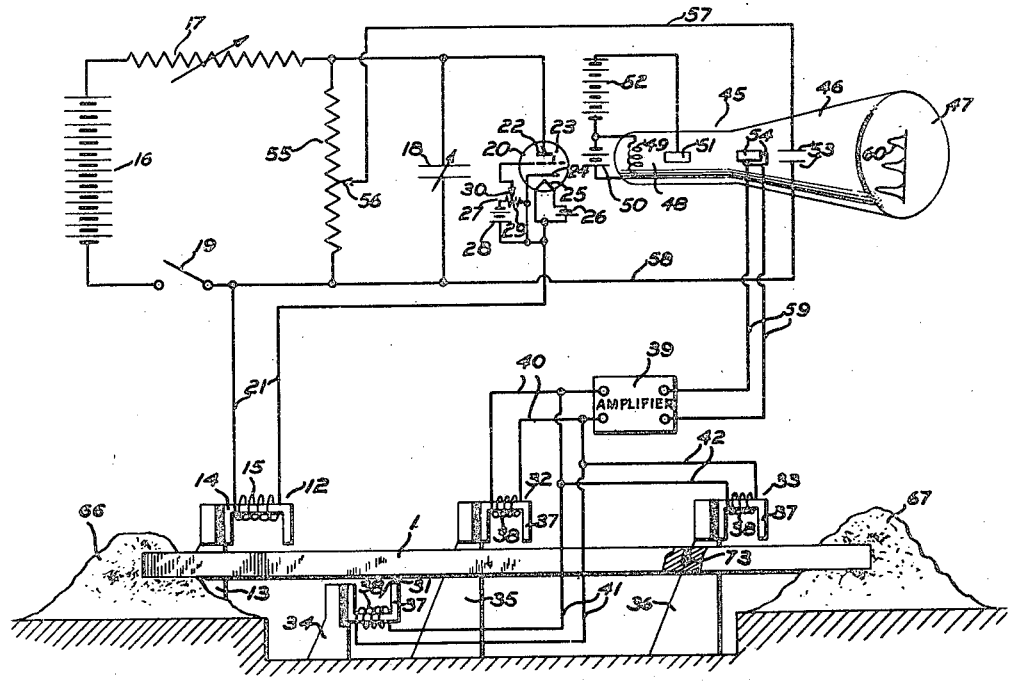
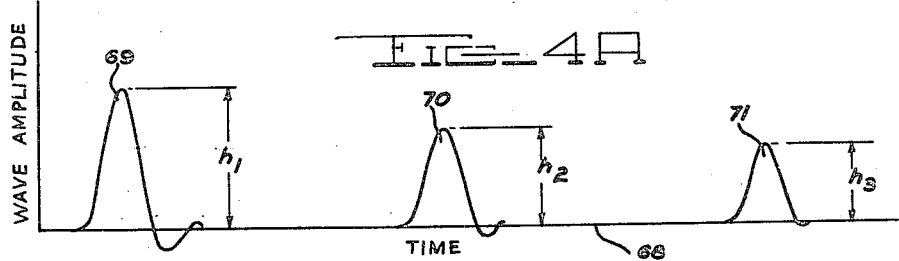
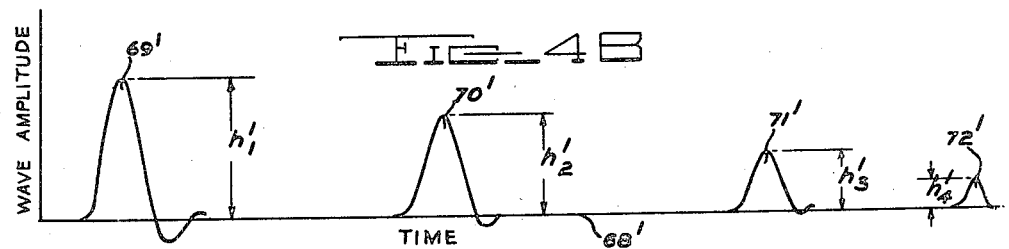

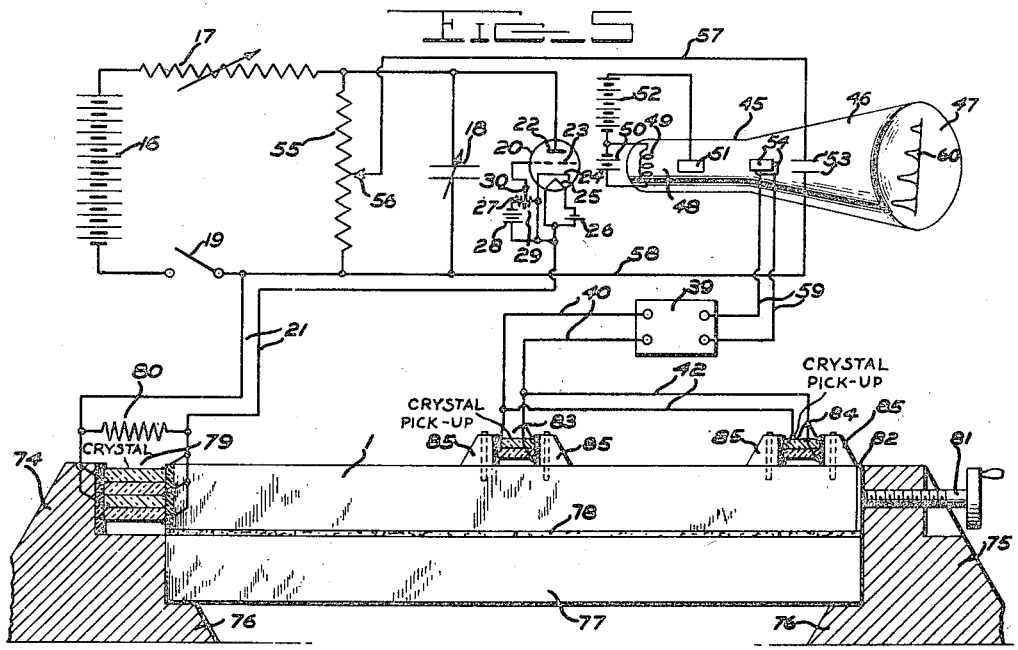
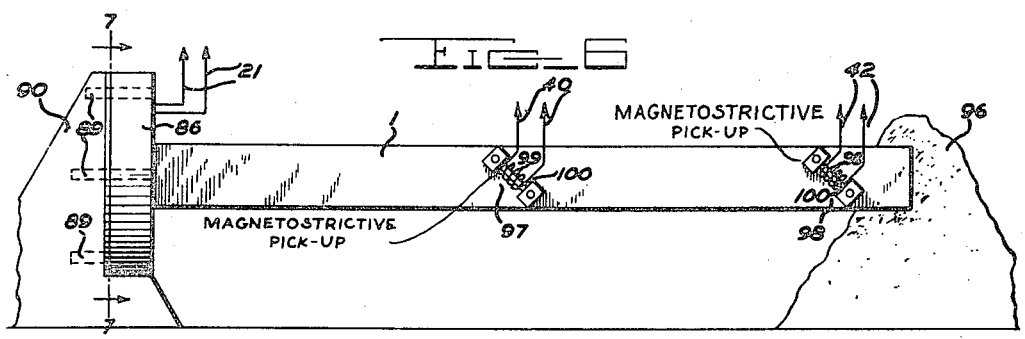
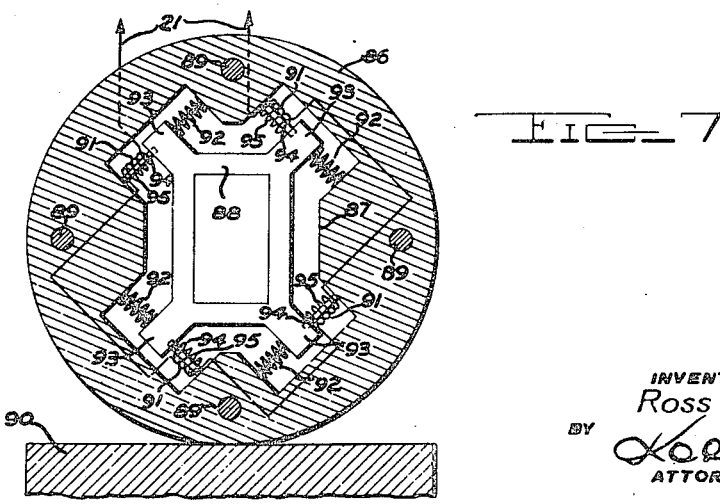

Patented Feb. 15, 1949

2,461,543

UNITED STATES PATENT OFFICE 2,461,543

APPARATUS AND METHOD FOR STUDYING WAVE PROPAGATION

Ross Gunn, Washington, D. C.

Application February 1, 1941, Serial No. 377,067

11 Claims. (Cl. 73—67)

(Granted under the act of March 3, 1883, as amended April 30, 1928; 370 O. G. 757)

My invention relates to an apparatus and method for studying wave propagation and more particularly to an apparatus and method of the stated character for determining the characteristics of an elastic wave or the physical properties of a body in which such a wave is propagated.

In accordance with the present invention, the method of determining the characteristics of an elastic wave includes broadly the steps of subjecting an elastic body to a series of intermittent substantially equal impulses to set up in the body a succession of similar elastic waves, the periodicity of the impulses being such that the energy of one elastic wave is substantially dissipated before the succeeding wave is initiated. Substantially simultaneously with the initiation of each wave relative movement is initiated between an indicating beam and a surface to establish a time axis; and thereafter the beam is deflected transversely of its time axis an amount proportional to the amplitude of the elastic wave. The wave pattern thus formed by the indicating beam on the surface will be characteristic of the elastic wave and not only provides a measure of the velocity of propagation of the elastic wave but also shows clearly the diminution in amplitude of the wave as the disturbance moves along the body.

The diminution in amplitude of the elastic wave caused by reflection and absorption of the wave energy is intimately related to the physical properties of the body in which the wave is propagated. Thus defects in the body, which may be any inhomogeneity, caused reflection of the wave energy with attendant decrease in amplitude of the elastic wave, while the diminution in amplitude of the wave caused by absorption or internal frictional losses is characteristic of the elastic properties of the body. By noting the amplitude of a wave set up in an elastic body or by comparing the amplitude of the wave so propagated with that of an elastic wave propagated in a standard test body, it is possible to determine the physical properties of the body under test.

While the method of the present invention may be carried into execution by many different types of apparatus that will readily suggest themselves to those skilled in the art in the light of the teachings herein, the preferred embodiment contemplates the use of means for supporting the elastic body in which the wave is to be propagated and periodically operable impulse imparting means for setting up in the body a succession of elastic waves. The means for supporting the body may be such as to allow or substantially prevent the reflection at its ends of an elastic wave set up therein.

Electromechanical means is disposed in juxtaposed relation to the body and is operable by the elastic waves propagated therein in proportion to the amplitude thereof. An oscillograph operable in synchronism with the impulse imparting means is arranged to be actuated by the electromechanical means for deflecting the oscillograph beam an amount proportional to the amplitude of the elastic wave. Thus the characteristics of the elastic wave and the physical properties of the body in which it is propagated may be readily indicated and determined.

The apparatus and method of the present invention may be employed with any type of material whether finished or unfinished; and, while conveniently applicable to materials wherein the length is materially in excess of the width, are still for application with bodies of almost any configuration. As illustrative but not restrictive of materials to which the present invention is applicable, plastics, wood and magnetic or nonmagnetic metals or alloys may be noted either in their raw state or in their finished state as manufactured products. It should be noted that the determination of the physical properties of the body in accordance with the present invention is achieved without destruction of the body under test.

In the light of the foregoing it is among the several objects of my invention to provide an apparatus and method for determining the characteristics of an elastic wave whether the wave be longitudinal, transverse or torsional in nature; to provide an apparatus and method for nondestructively determining the physical properties of a body which utilizes the diminution in amplitude of an elastic wave however propagated in the body as an index of its physical properties; to provide a method of the character above noted in which the elastic waves propagated in the body under test and in a standard test body are compared to ascertain unknown physical properties; and to provide a method for determining the physical properties of a body in which the body under test is subjected to tension within its elastic limit to enhance the diminution in amplitude of an elastic wave propagated therein in the presence of a defect.

Other objects and many of the attendant advantages of this invention will be readily appreciated as the same becomes better understood by reference to the following detailed description when considered in connection with the accompanying sheets of drawings wherein:

Fig. 1 depicts one embodiment of the apparatus of the present invention wherein electromechanical means of the electromagnetic type are responsive to and are employed for initiating a succession of transverse waves in a body and wherein the body is tensioned and supported to allow the reflection at its ends of the elastic waves set up therein;

Fig. 2A shows the oscillograph wave pattern formed in the apparatus of Fig. 1 when the body under test is substantially homogeneous and is supported such that the transverse elastic waves are reflected at each end in the same phase;

Fig. 2B shows the oscillograph wave pattern formed in the apparatus of Fig. 1 when the body under test is substantially homogeneous and is supported such that the transverse elastic waves are reflected at each end in phase opposition;

Fig. 2C shows the oscillograph wave pattern formed in the apparatus of Fig. 1 when the body under test includes an inhomogeneity and is supported such that the transverse elastic waves are reflected at each end in the same phase;

Fig. 3 discloses a further embodiment of the apparatus of the present invention wherein electromechanical means of the electromagnetic type are responsive to and are employed for initiating a succession of transverse waves in a body and wherein the body is supported to substantially prevent reflection at its end of the elastic waves set up therein;

Fig. 4A shows the oscillograph wave pattern formed in the apparatus of Fig. 3 when the body under test supported thereby is substantially homogeneous;

Fig. 4B shows the oscillograph wave pattern formed in the apparatus of Fig. 3 when the body under test supported thereby includes an inhomogeneity;

Fig. 5 depicts a still further embodiment of the apparatus of the present invention wherein electromechanical means of the piezo-electric type are responsive to and are employed for initiating a succession of longitudinal waves in a body and wherein the body is supported to allow the reflection at its ends of the elastic waves set up therein;

Fig. 6 discloses another and still further embodiment of the apparatus of the present invention wherein electromechanical means of the magnetostrictive type are responsive to and are employed for initiating a succession of torsional waves in the body and wherein the body is supported to substantially prevent the reflection at its ends of the elastic waves set up therein; and Fig. 7 is a sectional view taken on the line 7—7 of Fig. 6 showing the constructional details of the means for imparting a series of torsional impulses to the body.

In general, the elastic waves that may be propagated in a body are of three types, namely, longitudinal, torsional and transverse. The velocity of propagation of a longitudinal or compressional wave is given by the equation $$Vc = \sqrt{\frac{Y}{d}} \qquad \text{Eq. (1)}$$

where $Y$ is Young's modulus and $d$ is the density of the medium. The velocity of propagation of such a wave is independent of tension to a fair degree of approximation.

Torsional waves, on the other hand, are propagated with a velocity given by the equation $$Vt = \sqrt{\frac{q}{2d(u+1)}} \qquad \text{Eq. (2)}$$

where $q$ is the coefficient of rigidity, $d$ is the density and $u$ is Poisson's ratio.

Transverse waves are propagated with a velocity that is a complicated function of the stiffness of the body, the shape of the impact wave and the velocity of propagation of the associated longitudinal wave. The velocity of propagation of transverse waves is dependent upon the tension applied to the body.

Any inhomogeneity in a body in which either a longitudinal, transverse or torsional wave is being propagated manifests itself by a partial reflection of the elastic wave at the interface of the inhomogeneity. In general the ratio of the amplitude of the elastic wave reflected at the interface of the inhomogeneity to the amplitude of the wave incident thereupon is given by the following equation $$\frac{E_r}{E_i} = \frac{d_1 A_1 V_1 - d_2 A_2 V_2}{d_1 A_1 V_1 + d_2 A_2 V_2} \qquad \text{Eq. (3)}$$

where $E_r$ and $E_i$ represent the amplitude of the reflected and incident waves, $d_1$ and $d_2$ the density respectively of the homogeneous and inhomogeneous portions of the body, $V_1$ and $V_2$ the velocities respectively of the elastic wave in these portions, and $A_1$ and $A_2$ the cross sectional areas respectively of the homogeneous portion of the body and of the reduced homogeneous portion of the body at the interface of the inhomogeneity. Thus it is evident that defects in a body, which may be any inhomogeneity, can be detected by noting the decrease in amplitude of any elastic wave propagated in the body and transmitted through the inhomogeneity.

The decrease in amplitude of the elastic wave, however, is also a measure of the energy absorbed or dissipated in the body by internal frictional losses. Canfield has shown in a paper entitled "Internal friction as a physical test of materials," Proceedings III, International Congress of Applied Mechanics, Stockholm, 1931, vol. II, p. 331, that the internal frictional losses are characteristic of the physical history of the body under test. In the case of metals and their alloys, for example, it was shown that annealing, cold-working and fatigue caused different internal frictional losses. Under certain circumstances a complete knowledge of the elastic history of a body is of great importance. Such knowledge is readily obtainable with the apparatus and method of the present invention through the comparison of the decremental amplitude of an elastic wave propagated in a body under test with that known to be characteristic of a standard test body.

Turning now to Fig. 1 of the drawings, there is shown depicted therein, by way of illustration, a steel rail 1 supported in any convenient manner to permit the reflection at its ends of an elastic wave set up therein. One end of the rail is shown rigidly secured to and embedded in a pier 2 of any suitable material. While the other end may be similarly mounted, I have shown instead a socket 3 secured thereto in any convenient manner fixedly supporting a mass 4. The mass 4 has such a size and elastic properties in relation to the pier 2 as to cause both ends of the rail 1 to have substantially similar reflecting characteristics.

In general the amount of reflection at the body ends depends, among other things, upon the rigidity of the supports and their mode of securement to the body; and the phase of the reflection upon the stiffness and material of the supports. Thus, if the elastic wave passes from one medium to another in which the restoring force per unit displacement is greater, in-phase reflection ensues, while if the passage is from one medium to another in which the restoring force per unit displacement is less, the wave is reflected in phase opposition. The end supports in Fig. 1 may be designed in relation to the body supported to provide either reflection in the same phase or reflection in phase opposition at the body ends as desired. In any event, however, the design of the end supports is such that substantial reflection ensues at the body ends to permit the wave to travel back and forth along the body a number of times.

In some cases it is desirable to place the body under tension in which the wave is to be propagated. This has the effect of distending or enlarging certain types of inhomogeneities in the body, such as fissures or fine cracks, thus accentuating the transmission and reflection of the wave energy at the inhomogeneity. The body, however, must not be subjected to tension beyond its elastic limit. Tension is conveniently applied to the rail 1 in the apparatus of Fig. 1 through the spindle 5 of the worm gear 6 in threaded engagement with one end of a tension indicating dynamometer 7, the other end of which is secured to the rail socket 3. The worm gear 6 is rotatably mounted on a pier 8 and is driven by the worm 9 of a reversible electric motor 10 fixed to the support 11. By suitable energization of the motor 10 any desired tension may be applied to the body under test.

Any convenient means may be employed for imparting an impulse to the body or rail 1 under test. As shown in the drawings an electromechanical device 12 of the electromagnetic type is employed for this purpose, the device being disposed in juxtaposed relation to the rail and rigidly supported from the pier 13 in an insulating manner. The electromechanical device 12 includes a U-shaped core or suitably polarized body 14 of soft iron or any other ferromagnetic material having wound thereabout in any convenient manner the solenoid 15. Momentary energization of the solenoid 15 causes intense magnetization of the core 14, the device under these circumstances acting as an electromagnet. When so energized the electromechanical device 12 causes a momentary transverse deformation of the steel rail 1; and in this manner effectively imparts an impulse thereto which sets up in the rail a transverse elastic wave for propagation lengthwise thereof.

Periodic energization of the electromechanical device 12 for imparting to the elastic body 1 a series of intermittent impulses may be achieved through the use of any convenient prior art electrical circuit. For this purpose, I have shown in the drawings, by way of illustration, a conventional relaxation circuit including a capacitor operable to be periodically charged and then discharged through the electromechanical device.

The circuit is comprised of a suitable source of electromotive force 16 in series with a variable resistor 17 and capacitor 18 and operable to charge the capacitor upon closure of the switch 19. A gas triode 20, such as a thyratron, is serially connected with the solenoid 15 of the electromechanical device 12 which together constitute a circuit branch in parallel with the variable capacitor 18, these circuit connections being achieved principally through the conductors 21. The envelope of the thyratron 20 is provided with a suitable gaseous filling and encloses the conventional anode 22, control grid 23 and cathode 24, the latter being heated to an electron emissive temperature by the filament 25 energized by a suitable source of electromotive force 26. A potentiometer 27 including a source of electromotive force 28, resistor 29 and slidable contact 30 provides a variable negative bias for the grid 23 of the thyratron.

As is well known in relaxation circuits of this type the grid bias voltage prevents current flow through the thyratron 20 during charging until the voltage across the capacitor 18 and plate circuit reaches the breakdown value. At this point the capacitor 18 discharges rapidly through the thyratron 20 and loses its potential. As soon as the condenser voltage drops below the ionization potential of the gas in the tube 20 the grid 23 regains control and the current through the tube ceases to flow. The capacitor 18 then starts to recharge, beginning a new cycle of operation. By periodically discharging the capacitor 18 through the solenoid 15 of the electromechanical device 12 the rail or body 1 under tension is subjected to a series of intermittent impulses to set up in the same a succession of elastic waves.

The form of the voltage wave across the plates of the capacitor 18 attending the charge and discharge of the same is of the saw-tooth type for the relaxation circuit shown in the drawings. The amplitude of the saw-tooth voltage wave and hence the amplitude of the impulse to which the rail is subjected is controlled by the break-down potential of the thyratron 20, which is largely determined by the grid bias applied to the grid 23 of the tube. Thus, by appropriate adjustment of the slidable contact 30 of the potentiometer the amplitude of the impulse to which the rail is subjected may be varied throughout a wide range, the amplitude of successive impulses for any one setting of the slidable contact remaining substantially constant. It is important that some means be provided for varying the amplitude of the mechanical impulse, for as shown by Canfield in his paper previously referred to herein, the internal frictional losses in the body are dependent in an important manner upon the amplitude of the elastic wave initiated in the body.

The periodicity of the saw-tooth voltage wave and hence the periodicity of the intermittent impulses to which the rail is subjected is controlled by appropriate adjustment of the variable resistor 17 and variable capacitor 18. It is important that the periodicity of the mechanical impulses be such that the energy of one elastic wave be substantially dissipated before a succeeding wave is initiated in the body under test. If the periodicity of the impulses is not adjusted for such a relationship successive waves will interfere with each other making an interpretation of the oscillograph pattern quite difficult if not impossible.

The relaxation circuit elements are so chosen and designed as to furnish the electromechanical device 12 with pulses of electrical energy adequate for the purpose at hand.

From the foregoing it should be clear that the electromechanical device 12 and the relaxation circuit are such as to impart to the elastic body or rail 1 a series of intermittent substantially equal impulses to set up in the body a succession of similar elastic waves, the periodicity of the impulses being preferably such that the energy of one elastic wave is substantially dissipated before the succeeding wave is initiated. As each wave proceeds along the rail or body 1 for alternate reflection at its ends it is accompanied by a progressively diminishing deformation of the body attending the dissipation of the wave energy. The magnitude of this deformation which is proportional to the amplitude of the propagated wave may be determined by any suitable instrumentalities at one or more points along the body.

As shown in the drawings, a plurality of electromechanical devices 31, 32 and 33 of the electromagnetic type are disposed in juxtaposed relation to the body 1 at spaced points therealong and are each operable by the elastic waves propagated in the body in proportion to their amplitude. Piers 34, 35 and 36 rigidly support the electromechanical devices 31, 32 and 33 in an insulating manner. Each of the electromechanical devices 31, 32 and 33 includes a U-shaped permanent magnet or suitably polarized body 37 of soft iron or other ferromagnetic material appropriately wound with a coil or solenoid 38. As each wave proceeds along the rail 1 for alternate reflection at its ends and arrives at a point in the body opposite any of the electromechanical devices 31, 32 and 33, the deformation in the body at this point will cause a variation in the air gap of the magnet 37 with an accompanying change in the reluctance of the magnetic circuit. A variation in flux through the magnet 37 necessarily ensues with this change in reluctance which causes an electromotive force to be induced in the coil 38, the magnitude of which is proportional to the amplitude of the elastic wave at the point in question.

Where the voltages induced in the solenoids 38 of the electromechanical devices 31, 32 and 33 are not sufficiently large they may be amplified by any known prior art voltage amplifier 39 before applying the same to the oscillograph. The electromechanical device 32 is shown connected directly to the input terminals of the amplifier 39 by the conductors 40, while the electromechanical devices 31 and 33 may be optionally connected to these amplifier terminals by the conductors 41 and 42 respectively through the switches 43 and 44.

For determining the characteristics of the elastic waves propagated in the test body an oscillograph is employed. The oscillograph is operable in synchronism with the impulse imparting means and is actuatable by one or more of the electromechanical means disposed along the body for deflecting the oscillograph beam an amount proportional to the amplitude of the elastic wave. It is to be emphasized that any prior art type of oscillograph may be employed in carrying out the present invention regardless of whether the oscillograph pattern be visually or photographically produced.

In the drawings I have shown, purely by way of example, an oscillograph 45 of the cathode-ray type, including the conventional envelope 46 provided at one end with a suitable fluorescent screen 47 and at the other end with an electron gun identified in general by the reference character 48. The electron gun is comprised of the electron emissive cathode 49 energized by a suitable source of electromotive force 50 and the tubular anode 51 maintained at a positive potential with reference to the cathode 49 by the source of electromotive force 52. Two pairs of electrostatic plates 53 and 54 are disposed intermediate the electron gun 48 and the fluorescent screen 47 for appropriately deflecting the electron beam.

While any suitable sweep circuit may be employed for deflecting the electron beam to establish a time axis, I have shown for illustrative purposes a sweep circuit that deflects the electron beam horizontally to establish a horizontal time axis. The sweep circuit is operable in synchronism with the charge and discharge of the capacitor of the relaxation circuit and in consequence thereof initiates the sweep of the electron beam substantially simultaneously with the initiation of each elastic wave in the body under test.

As shown in the drawings the sweep circuit includes a resistor 55 connected in parallel with the capacitor 18 to provide a potentiometer and permit the utilization of any fractional part of the voltage developed across the plates of the capacitor for application to the deflecting plates 53, this being achieved by manipulation of the slidable contact 56. The slidable contact 56 is connected by the conductor 57 to one of the electrostatic plates 53 to impress a potential of one polarity thereon, the remaining electrostatic plate 53 of this pair being connected to the resistor 55 and capacitor 18 as indicated by the conductor 58 for impressing a potential of opposite polarity thereon.

As noted previously herein, the voltage wave developed across the plates of the capacitor 18 is of the saw-tooth type, the sloping portion of each tooth or serration of the voltage wave being formed during the charging of the capacitor 18 and the face or substantially vertical portion of each tooth or serration being formed during the substantially instantaneous discharge of the capacitor. A replica of this voltage wave is applied to the deflecting plates 53 of the cathode-ray tube by the sweep circuit.

Thus, substantially simultaneously upon the completion of the discharge of the capacitor 18 and the initiation of an elastic wave in the body 1, the electron beam will be at one end of the time axis in a position to commence its horizontal sweep to the right. From thence the beam will be deflected horizontally along the time axis as the capacitor 18 charges and as the elastic wave moves along the rail for alternate reflection at its ends. The horizontal sweep of the electron beam will be completed when the energy of the elastic wave is substantially dissipated in the body for reasons already noted. After this occurs the capacitor 18 again discharges rapidly through the solenoid 15 of the electromechanical device 12 and concurrently with the discharge the electron beam moves rapidly to the left from the far end of its horizontal time axis to a position at the other end thereof to again commence its horizontal sweep in synchronism with the elastic wave as the disturbance moves along the body.

For deflecting the cathode-ray beam transversely of its sweep direction an amount proportional to the amplitude of the elastic wave propagated in the test body the remaining pair of electrostatic plates 54 is employed, these plates being connected to the output terminals of the voltage amplifier 39 by the conductors 59. As noted previously herein, as each wave proceeds along the rail 1 for alternate reflection at its ends and arrives at a point in the body opposite any of the electromechanical devices 31, 32 and 33, a voltage will be induced in the coil 38, the magnitude of which is proportional to the amplitude of the elastic wave at the point in question. It is this voltage in amplified form that is applied to the deflecting plates 54 of the oscillograph. Thus, it should be clear that if a succession of similar elastic waves is propagated in the body under test, there will be produced on the fluorescent screen 47 of the oscillograph a synchronously repeated and readily visible wave pattern 60 that will be characteristic of the elastic wave.

In operation, the desired number of electromechanical devices 31, 32 and 33 for deflecting the cathode-ray beam an amount proportional to the amplitude of the elastic wave is first connected in circuit with the voltage amplifier 39. In Fig. 1 only the electromechanical device 32 is shown so connected, the remaining two devices 31 and 33 being disconnected from the voltage amplifier by opening their respective switches 43 and 44. The number of electromechanical devices employed in this embodiment of the invention is purely optional, the effect of employing more than one serving to provide a proportionate decrease in the pulse interval between successive pulses along the time axis of the oscillograph pattern 60. This latter feature, however, may at times prove to be highly advantageous.

On the assumption that the rail initially mounted in the apparatus is a standard homogeneous test body and that the end supports are such as to insure in-phase terminal reflection of the elastic waves, the tension in the rail is gradually increased by suitably energizing the electric motor 10 and noting the reading of the dynamometer 7 until the tension is somewhat short of and below the elastic limit for the material of the rail. Where it is desirable that the body under test be placed under tension the standard test body in the case of transverse waves must be subjected to the same tension, for as already noted the velocity of propagation of transverse waves is dependent upon the tension applied to the body.

The switch 19 of the relaxation circuit is then closed and the variable resistor 17 and capacitor 18 are then manipulated until the wave pattern 60 on the fluorescent screen 47 shows substantially no interference phenomena. This condition is achieved when the oscillograph pattern 60 shows a series of discrete pulses of regularly diminishing amplitude. The periodicity of the mechanical impulses is then such that the energy of one elastic wave is substantially dissipated before a succeeding wave is initiated in the standard test body. The slidable contact 30 associated with the potentiometer 27 of the thyratron is then adjusted so as to subject the standard test body to a mechanical impulse of desired amplitude. The oscillograph pattern 60 formed on the fluorescent screen 47 after having made all these adjustments is then carefully noted or photographed since it is characteristic of the standard test body and may be employed as a standard of comparison.

The body or rail whose elastic properties are to be determined is then substituted for the standard test body in the apparatus, it being assumed that it is known that the body under test is homogeneous. The substituted body is then subjected to the same degree of tension as was the standard test body and the relaxation circuit adjustments previously made are not disturbed so that the periodicity and amplitude of the mechanical impulses are not altered. The body of unknown elastic properties being mounted for test under the same conditions as was the standard test body, the switch 19 of the relaxation circuit is then closed. The oscillograph pattern obtained is that indicated in Fig. 2A and identified in general by the reference character 61.

It will be observed that the wave pattern 61 of Fig. 2A consists of a series of discrete pulses of diminishing amplitude each of which is formed as the elastic wave arrives at a point in the body opposite the electromechanical device 32 as the wave is alternately reflected at the body ends. The amplitude of each of these pulses is proportional to the amplitude of the propagated wave at the instant it arrives at a point opposite the electromechanical device 32, the diminution in amplitude of the pluses with time being caused by the gradual dissipation of the wave energy through internal frictional losses in the body. For each successive elastic wave propagated in the body the oscillograph pattern 61 of Fig. 2A is synchronously repeated within the persistence of the screen so that a stationary, continuous wave pattern is produced on the fluorescent screen.

By comparing the oscillograph pattern 61 with the pattern 60 produced for the standard test body, any deviation in elastic properties of the body under test from those of the standard test body may be determined at once. Thus, for example, different characteristic oscillograph patterns will be formed by the standard test rail corresponding respectively to known degrees of annealing, coldworking and fatigue. If the oscillograph pattern for the test body of unknown physical properties is substantially identical with any of the three characteristic oscillograph patterns, the fact that the test body has been subjected to annealing, cold-working or fatigue will become immediately known as well as the degree thereof. Any deviation in amplitude of the oscillograph pattern for the body of unknown physical properties from that of a similarly-shaped characteristic oscillograph pattern may be employed for determining empirically the difference in annealing, cold-working or fatigue of the body of unknown physical properties from that of the standard test body. Thus, by comparing the amplitude of an elastic wave propagated in a test body of unknown physical properties with that of an elastic wave propagated under like conditions in a standard test body, it is possible to determine the physical properties of the test body.

Where the end supports in the apparatus of Fig. 1 are such as to cause the reflection of the elastic wave at the body ends in phase opposition, an oscillograph pattern for the body under test of the character depicted at 62 in Fig. 2B will be found. The wave pattern 62 is employed in the same manner as that disclosed in Fig. 2A for determining the unknown physical properties of the body under test. Either of the oscillograph patterns 61 or 62 in Figs. 2A and 2B or any of those delineated hereinafter provides a measure of the velocity of propagation of the elastic wave whatever its nature. The periodicity of the oscillograph sweep circuit being known, it is possible to calibrate the horizontal time axis of the oscillograph in any convenient units of time. The distance of the first pulse in either of the oscillograph patterns 61 or 62 of Figs. 2A and 2B from the left end of the horizontal time axis is a measure of the time consumed by the elastic wave in traveling from the electromechanical impulse imparting device 12 to the electromechanical device 32 responsive to the wave so propagated. From the known distance between the devices 12 and 32 and the time consumed by the elastic wave in traveling therebetween, it is possible to compute the velocity of propagation of the elastic wave and from this the modulus of elasticity of the body if desired.

Where the body or rail substituted for the standard test body includes a defect such as an inhomogeneity, the present invention makes it possible not only to detect the presence of a defect but also to locate the same in the body with a fair degree of precision. Thus, if the defect in the body is a fine crack or fissure 63 as indicated in Fig. 1 this inhomogeneity, like any other, will manifest itself by a partial reflection of the elastic wave at its interface. Since, in the case of the fissure the elastic wave in the rail passes at the interface of the inhomogeneity 63 from one medium to another in which the restoring force per unit displacement is less, the partial reflection at the interface will be in phase opposition. The oscillograph pattern obtained with this defect is indicated in Fig. 2C and identified in general by the reference character 63', it being assumed that the end supports for the body are such as to insure in-phase terminal reflection of the elastic wave propagated in the body.

In the oscillograph pattern 63' of Fig. 2C the reference character 64 identifies the pulses caused by the primary elastic wave as the wave is transmitted through the defect 63 and alternately reflected in phase at the body ends, these primary pulses 64 diminishing in amplitude with the diminution in amplitude of the primary elastic wave. The portion of the primary wave energy reflected at the interface of the inhomogeneity 63 and termed the reflected or secondary wave also actuates the electromechanical device 32. The pulses in the oscillograph pattern 63' caused by the secondary waves are identified by the reference character 65 in Fig. 2C and are in phase opposition. It is at once evident that after some time has elapsed after the initiation of the elastic wave in the body under test that excessive interference will occur between the primary and secondary waves in the body. Thus, it follows that the first part of the oscillograph pattern 63' is quite significant and becomes progressively less significant with the elapse of time. The latter part of the oscillograph pattern 63' may at times be difficult, if not impossible, to interpret and may be omitted from the trace on the fluorescent screen of the oscillograph by suitable adjustment of the gain of the amplifier 39 or by adjustment of the potentiometer contact 56.

By comparing the oscillograph pattern 63' of Fig. 2C with the oscillograph pattern 61 of Fig. 2A for a homogeneous body, it is known at once that the body under test includes an inhomogeneity. This fact, however, is also ascertainable without resort to comparison by reason of the abrupt decrease in amplitude of the primary pulses 64 in the oscillograph pattern 63' of Fig. 2C. For between successive arrivals of the primary elastic wave at a point in the body opposite the electromechanical device 32 in a position to actuate the same, the primary wave has had abstracted from it two increments of energy by the reflection of the wave at the interface of the inhomogeneity 63, one increment being abstracted as the wave proceeds from the electromechanical device 32 to the end support 2 and another as the reflected primary wave proceeds from the end support 2 back to the device 32. Thus, successive primary pulses 64 of the oscillograph pattern 63' of Fig. 2C will show a rather abrupt diminution in amplitude, as clearly indicated in the drawings.

The location of the defect in the body or rail 1 is possible from a mere inspection of the first two primary pulses 64 and the intermediate secondary pulse 65 of the oscillograph pattern of Fig. 2C, this portion of the pattern, as already noted, being the most significant portion thereof. Since the secondary pulse 65 is substantially medially positioned with reference to the primary pulses 64 it follows that the inhomogeneity 63 is substantially midway between the electromechanical device 32 and the end of the beam supported by the pier 2. This follows from the fact that the increment of the primary wave to be initially reflected at the interface of the inhomogeneity 63 travels with the primary wave from the electromechanical device 32 to the inhomogeneity and back in one half the time that the primary wave consumes in traveling from the electromechanical device 32 to the end of the beam supported by the pier 2 and back. In this connection it should be noted that the oscillograph pattern 63' of Fig. 2C must be interpreted with reference to the number of electromechanical devices connected in circuit with the amplifier and their positions relative to the body under test.

The rather abrupt diminution in amplitude of the primary pulses 64 of Fig. 2C may be further enhanced in the presence of a defect by subjecting the body under test to tension as indicated in Fig. 1. As previously noted herein, subjecting the rail to tension within the elastic limit of the material has the effect of temporarily distending the fissure or crack 63. Since the cross sectional area $A_2$ of the homogeneous portion of the body at the interface of the inhomogeneity 63 is thereby further decreased it follows from a consideration of Eq. 3 herein that the amplitude of the reflected wave is materially increased with a corresponding decrease in the amplitude of the primary wave transmitted at the inhomogeneity. Thus, successive primary pulses 64 of the oscillograph pattern of Fig. 2C show a still further decrease in amplitude.

Turning now to Fig. 3 of the drawings, there is shown a further embodiment of the apparatus of the present invention which differs from that depicted in Fig. 1 only in the nature of the end supports employed for the body under test and in the fact that the electromechanical devices responsive to the elastic waves propagated in the body are all utilized. Hence those parts of the apparatus depicted in Fig. 3 that are identical in construction and operation with those of the apparatus of Fig. 1 have been identified by similar reference characters.

The end supports 66 and 67 for the steel rail 1 in the embodiment of Fig. 3 are such as to substantially prevent reflection at the body ends of the transverse wave propagated therein. The end supports 66 and 67 are shown purely by way of example as piles of sand in which the ends of the rail are embedded and as such will absorb substantially all of the wave energy arriving at the terminal portions of the rail. It is to be understood, however, that any other type of end support may be employed so long as it will substantially dissipate the wave energy in the rail arriving at the terminal portions thereof. In further contrast to the apparatus of Fig. 1 the rail 1 in the apparatus of Fig. 3 is not placed under tension. Since the transverse elastic waves propagated in the rail are not alternately reflected by the rail ends as in the embodiment of Fig. 1, at least two electromechanical devices responsive to the elastic waves must be connected in circuit with the voltage amplifier 39. In Fig. 3 all three of these devices identified by the reference characters 31, 32 and 33 are shown for illustrative purposes connected to the input terminals of the voltage amplifier.

On the assumption that the rail initially mounted in the apparatus of Fig. 3 is a standard homogeneous test body, the switch 19 of the relaxation circuit is closed and the variable resistor 17 and capacitor 18 manipulated until the oscillograph pattern shows a series of discrete pulses of regularly diminishing amplitude. The periodicity of the mechanical impulses is then such that the energy of an elastic wave is substantially dissipated before a succeeding wave is initiated in the standard test body. The slidable contact 30 associated with the potentiometer 27 of the thyratron is then adjusted so as to subject the standard test body to a mechanical impulse of desired amplitude. The oscillograph pattern 60 formed on the fluorescent screen 47 after having made all these adjustments is then carefully noted, since as stated previously herein it is characteristic of the standard test body and may be employed as a standard of comparison. The body or rail whose elastic properties are to be determined is then substituted for the standard test body in the apparatus of Fig. 3, it being assumed that it is known that the body under test is homogeneous. The body of unknown elastic properties being mounted for test under the same conditions as was the standard test body, the switch 19 of the relaxation circuit is closed. The oscillograph pattern obtained is that indicated in Fig. 4A and identified in general by the reference character 68.

It will be observed that the oscillograph pattern 68 consists of a series of three pulses 69, 70 and 71 of diminishing amplitude $h_1$, $h_2$, and $h_3$ formed respectively by the electromechanical devices 31, 32 and 33 as the transverse elastic wave arrives at points in the body opposite the devices to actuate the same. That only three pulses are formed in the oscillograph pattern 68 follows from the fact that substantially none of the wave energy is reflected at the terminal portions of the rail supported by the sand piles 66 and 67. For each successive elastic wave propagated in the body the oscillograph pattern 68 is synchronously repeated within the persistence of the screen, as in the embodiment of Fig. 1, so that a stationary, continuous wave pattern is produced on the fluorescent screen. By comparing the oscillograph pattern 68 with the oscillograph pattern 60 produced for the standard test body, the unknown elastic properties and hence the elastic history of the body under test may be determined, all as described in connection with the embodiment of Fig. 1.

When the body or rail 1 substituted for the standard test body includes a defect such as an inhomogeneity 73 the apparatus of Fig. 3, like that of Fig. 1 and those to be subsequently described, makes it possible to detect and locate the same. Thus, if the defect 73 in the rail is a solid inclusion as indicated in Fig. 3, this inhomogeneity will manifest itself by a partial reflection of the elastic wave at its interface. Since the restoring force per unit displacement for the material of the solid inclusion is assumed to be greater than that for the material of the rail, the partial reflection of the elastic wave at the interface of the inhomogeneity will be in phase. The oscillograph pattern obtained with this defect is indicated in Fig. 4B and identified in general by the reference character 68'.

The oscillograph pattern 68', like the pattern 68 of Fig. 4A, consists of a series of three pulses 69', 70' and 71' of diminishing amplitude $h_1'$, $h_2'$ and $h_3'$ as the primary transverse elastic wave is transmitted along the rail from one end to the other and passes through the inhomogeneity 73. The portion of the primary wave energy reflected at the interface of the inhomogeneity 73 and termed the reflected or secondary wave is shown in the oscillograph pattern 68' as actuating the electromechanical device 32. The pulse in the oscillograph pattern 68' corresponding to this actuation is identified by the reference character 72' and has an amplitude $h_4'$. Since the terminal reflection in the body under test has been substantially eliminated, all parts of the oscillograph pattern 68' of Fig. 4B are significant, there being substantially no interference between the primary and secondary waves.

By comparing the oscillograph pattern 68' of Fig 4B with the oscillograph pattern 68 of Fig. 4A for a homogeneous body, the presence of the secondary pulse 72' in the pattern of Fig 4B shows at once that the body under test includes an inhomogeneity. This fact, however, is also ascertainable from an examination of the primary pulse 71' in the pattern of Fig. 4B, which has suffered a rather abrupt diminution in amplitude relative to the primary pulse 70' and the corresponding primary pulse 71 for the homogeneous body in the pattern of Fig. 4A. The substantial decrease in amplitude of the primary pulse 71' in the pattern of Fig. 4B is caused by the reflection of part of the energy of the primary elastic wave at the interface of the inhomogeneity 73. As in the embodiment of Fig. 1 the secondary pulse 72' in the oscillograph pattern of Fig. 4B can be employed for locating the defect in the rail. When employed for this purpose it should be again noted that the oscillograph pattern of Fig. 4B must be interpreted with reference to the number of electromechanical devices connected in circuit with the voltage amplifier and the position of these devices relative to the body under test.

Referring now to Fig 5 of the drawings, there is shown therein a still further embodiment of the apparatus of the present invention wherein electromechanical means of the piezo-electric type are responsive to and are employed for initiating a succession of longitudinal or compressional waves in the body under test; and wherein the body is supported to allow the reflection at its ends of the elastic waves set up therein.

Piers 74 and 75 fabricated of any suitable material have mounted thereon in any convenient manner as by the shoulders 76 the beam 77 which supports the body 1 under test through an intervening layer 78 of any suitable energy absorbing material. The layer 78, which may be a layer of felt, assists in dissipating the energy of the elastic waves set up in the test body and tends to suppress or dampen any vibrations which occur between the body 1 under test and its supporting beam 77. Since the number of end reflections is materially reduced by this mounting for the test body 1, the interference between the primary and secondary waves caused by the presence of a defect is also reduced. This has the very beneficial effect of making the latter portion of the oscillograph pattern 60 more significant. It is to be emphasized in this connection that it is within the purview of the present invention to utilize any mounting for the body under test which assists in dissipating the wave energy propagated therein.

For periodically imparting a mechanical impulse to the body under test there is employed an electromechanical device of the piezo-electric type identified in general by the reference character 79. This device is shown as including a plurality of superposed piezo-electric crystals provided with intervening and terminal metallic plates connected through the insulating face plates with the parallel resistor 80 in such a manner that any voltage developed across this resistor will be impressed across each of the crystals. The electromechanical device 79 is disposed intermediate one end of the test body 1 and the pier 74 and is held firmly in place through adjustment of the manually actuatable screw 81 and the pressure plate 82 associated with the pier 75 and the test body at the remaining end thereof. It should be clear from the foregoing that periodic discharge of the capacitor 18 of the relaxation circuit through the resistor 80 will cause a deformation of each of the crystals of the electromechanical device 79 in accordance with the well known piezo-electric effect and that in consequence thereof the body 1 will be subjected to a series of compressional impulses. In this manner a series of longitudinal or compressional waves may be initiated in the body or rail 1 under test.

The body 1 under test is shown purely by way of example as a steel rail. As each compressional wave proceeds along the rail or body 1 for alternate reflection at its ends it is accompanied by a progressively diminishing deformation of the body attending the dissipation of the wave energy. The magnitude of the deformation which is proportional to the amplitude of the propagated wave is determined in this embodiment by a plurality of electromechanical devices 83 and 84 of the piezo-electric type in juxtaposed relation to the body at spaced points therealong, each of these devices being operable by the elastic wave propagated in the body in proportion to the amplitude thereof.

Each of the devices 83 and 84 is identical in construction with that of the electromechanical device 79 except that two crystals are shown employed for purposes of illustration instead of four. The electromechanical devices 83 and 84 are held in fixed relation with reference to the rail by the blocks 85 suitably secured to the body under test; and are electrically connected to the input terminals of the voltage amplifier 39 by the conductors 40 and 42. As each wave proceeds along the rail for alternate reflection at its ends and arrives at a point in the body opposite either of the electromechanical devices 83 and 84, the deformation in the body at these points will cause a deformation of the piezo-electric crystals of the devices with the attendant generation of a voltage. The magnitude of the voltages so generated will be proportional to the amplitude of the elastic wave at the point in question.

Except for the structural differences noted above the apparatus of Fig. 5 is otherwise identical with that depicted and described in Fig. 1. Hence those parts of the apparatus disclosed in Fig. 5 that are identical in construction and operation with those of the apparatus of Fig. 1 have been identified by similar reference characters. With the exception of the tension feature, the apparatus of Fig. 5 is employed in a manner identical with that of Fig. 1 for ascertaining either the elastic history of the body under test or the presence of a defect therein, all as noted in detail hereinbefore.

In Figs. 6 and 7 there is depicted a still further embodiment of the apparatus of the present invention, wherein electromechanical means of the magnetostrictive type are responsive to and are employed for initiating a succession of torsional waves in a body and wherein the body is supported to substantially prevent the reflection at its ends of the elastic waves set up therein.

As indicated in the drawings the torsion head is shown as including a disc 86 suitably recessed or apertured at 87 to accommodate the spider 88 fixed to the body 1 under test. The disc 86 of the torsion head is rigidly secured by the pins 89 or otherwise to the pier 90. Periodic torsional impulses are imparted to the body 1 through clockwise rotation of the spider 88 (Fig. 7), this being achieved by electromechanical devices 91 of the magnetostrictive type acting against the compression springs 92. The springs 92 are of sufficient strength to maintain themselves and the electromechanical devices 91 in position between and in contact with the walls of the recess 87 and the arms 93 of the spider 88, thus centering the spider at all times with reference to the recessed disc 86 of the torsion head. Each of the electromechanical devices 91 is of conventional construction and includes tubes 94 of any convenient magnetostrictive material, such as nickel, surrounded by a coil 95. The coils 95 are serially connected and are arranged to be periodically energized by the capacitor 18 of the relaxation circuit through the conductors 21.

The remaining end of the body 1 under test, which is here shown for illustrative purposes as a steel rail, is embedded in and supported by a pile of sand 96 or other suitable material to substantially absorb the wave energy arriving at this end of the body and thus prevent reflection of the same. Deformation of the rail occasioned by the travel of successive torsional waves actuates similar magnetostrictive devices 97 and 98, each including a coil 99 and magnetostrictive tube 100 secured to the rail at spaced points therealong with the attendant generation of voltages proportional to the amplitude of the elastic wave at the points in question. The electromechanical devices 97 and 98 are connected to the input terminals of the voltage amplifier 39 by the conductors 40 and 42 as in the embodiments of the apparatus depicted in Figs. 3 and 5.

Except for the structural differences noted above, the apparatus of Figs. 6 and 7 is otherwise identical in construction with that depicted and described in Fig. 1 and is to be so understood. Furthermore the apparatus of Figs. 6 and 7 is employed in a manner identical with that of Fig.

3 for ascertaining either the elastic history of the body under test or the presence of a defect therein, all as noted in detail hereinbefore.

In connection with the various embodiments of the apparatus described hereinbefore it should be noted that either a transverse, longitudinal or torsional wave may be initiated in the body under test by using any type of electromechanical device whether it be electromagnetic, piezoelectric, or magnetostrictive in character; and that the amplitude of the wave so propagated may likewise be determined by any type or combination of types of such devices.

According to the provisions of the patent statutes, I have set forth the principle and mode of operation of my invention and have illustrated and described what I now consider to represent its best embodiments. However, I desire to have it understood that within the scope of the appended claims the invention may be practiced otherwise than as specifically illustrated and described.

The invention herein described and claimed may be used and manufactured by or for the Government of the United States of America for governmental purposes without the payment of any royalties thereon or therefor.

I claim:

1. A method of determining the physical properties of an elastic body which includes the steps of supporting an elastic body to substantially prevent the reflection at its ends of an elastic wave set up therein, subjecting the body to a series of intermittent substantially equal impulses to set up in the body a succession of similar elastic waves, the periodicity of the impulses being such that the energy of one elastic wave is substantially dissipated before the succeeding wave is initiated, substantially simultaneously with the initiation of each wave initiating relative movement between an electron beam and a surface to establish a time axis, thereafter deflecting the beam transversely of its time axis an amount proportional to the amplitude of the elastic wave at a plurality of points in the said body, and noting the wave pattern formed by the beam on the surface.

2. A method of determining the physical properties of an elastic body which includes the steps of subjecting an elastic body to tension within its elastic limit, imparting to the body so tensioned a series of intermittent substantially equal impulses to set up in the body a succession of similar elastic waves, the periodicity of the impulses being such that the energy of one elastic wave is substantially dissipated before the succeeding wave is initiated, substantially simultaneously with the initiation of each wave initiating relative movement between an electron beam and a surface to establish a time axis, thereafter deflecting the beam transversely of its time axis an amount proportional to the amplitude of the elastic wave at at least one point in the said body, and noting the wave pattern formed by the beam on the surface.

3. An apparatus for determining the characteristics of an elastic body comprising in combination means for supporting said elastic body, a relaxation circuit including a capacitor operable to be periodically charged and discharged, electromechanical means energizable by said capacitor for imparting to the elastic body a series of intermittent impulses to set up in the same a succession of elastic waves, a second electromechanical means in juxtaposed relation to the body and operable by the elastic waves propagated therein, and a cathode-ray oscillograph including a circuit for sweeping the cathode-ray beam and a circuit for deflecting the cathode-ray beam transversely of its sweep direction, the first of said oscillograph circuits being operable in synchronism with the charge and discharge of the capacitor for initiating the sweep of the cathode-ray beam substantially simultaneously with the initiation of each elastic wave and the second of said oscillograph circuits including the second mentioned electromechanical means for deflecting the cathode-ray beam transversely of its sweep direction an amount proportional to the amplitude of the elastic wave.

4. An apparatus for determining the characteristics of an elastic body comprising in combination means for supporting said elastic body to substantially prevent the reflection at its ends of an elastic wave set up therein, periodically operable impulse imparting means for setting up in the body a succession of similar non-interfering elastic waves, means disposed in juxtaposed relation to the body at spaced points therealong and operable by the elastic waves propagated therein in proportion to the amplitude thereof, and a cathode ray oscillograph, said oscillograph being connected such that a sweep of the cathode ray beam in one direction is initiated simultaneously with each operation of said impulse imparting means and deflection of said beam from its sweep path is initiated with operation of said juxtaposed means.

5. An apparatus for determining the physical properties of an elastic body comprising in combination means for supporting the body under test, periodically operable impulse imparting means for setting up in the body a succession of torsional elastic waves, electromechanical means disposed in juxtaposed relation to the body and operable by the elastic waves propagated therein in proportion to the amplitude thereof, and a cathode ray oscillograph, said oscillograph being connected such that a sweep of the cathode ray beam in one direction is initiated simultaneously with each operation of said impulse imparting means and deflection of said beam from its sweep path is initiated with operation of said electromechanical means.

6. A method of determining the physical properties of an elastic body which includes the steps of supporting a standard homogeneous elastic body having known degrees of cold-working, annealing and fatigue so that an elastic wave propagated therein will be reflected at the ends thereof thus permitting the wave to travel back and forth along said body; imparting a mechanical impulse to said body to set up in said body an elastic wave; noting, at a selected station in the path of said wave along said body, the diminution is amplitude of said wave as it travels back and forth along said body; substituting for the standard body a test body, the physical properties of which are to be determined; imparting to said test body a mechanical impulse equal to the mechanical impulse imparted to said standard body to set up in said test body an elastic wave having an initial amplitude equal to the initial amplitude of the wave propagated in said standard body; noting, at a selected station positioned on said test body at a distance from its reflecting ends equal to the distance of the first selected station from the reflecting ends of said standard body, the diminution in amplitude of said wave as it travels back and forth along said body; and comparing the diminuation in amplitude between succeeding waves in said test and standard bodies to determine the relative internal friction of said bodies, whereby the difference in the state of fatigue, cold-working and/or the degree of annealing may be empirically determined.

7. A method of determining the physical properties of an elastic body which includes the steps of supporting a standard homogeneous elastic body having known degrees of cold-working, annealing and fatigue so that an elastic wave propagated therein will be substantially absorbed at the ends thereof thus permitting the wave to travel along said body only once, imparting a mechanical impulse to said body to set up in said body an elastic wave, noting the amplitude of said wave at at least two selected stations spaced along said body in the path of said propagated wave, substituting for said standard body a test body, the physical properties of which are to be determined, imparting to said test body a mechanical impulse equal to the mechanical impulse imparted to said standard body to set up in said test body an elastic wave having an initial amplitude equal to the initial amplitude of the wave propagated in said standard body, noting the amplitude of said wave at at least two selected stations spaced along said test body in the path of said wave at a distance from the point at which the impact is delivered equal to the distance at which the first named selected stations are spaced from the point at which the impact is delivered to said standard body, and comparing the diminution in amplitude of the propagated wave at the selected points in the standard body with the diminution in amplitude of the propagated wave at the selected points in said test body to determine the relative internal friction of said bodies, whereby the difference in the state of fatigue, cold-working and/or degree of annealing may be empirically determined.

8. A method of determining the presence and location of defects in an elastic test body which includes the steps of supporting said test body so that an elastic wave propagated therein will be reflected at the ends thereof thus permitting the wave to travel back and forth along said body, subjecting said test body to tensional stresses to further enhance the presence of said defect by reducing the cross-sectional area of the homogeneous portion of the body at the interface of the defect, imparting an impulse to said body to set up in said body a primary elastic wave, observing the impulses on an oscillograph record indicating the deformations produced in said body by said wave at a selected station in the path of said wave along said body, whereby the presence of a defect occurring in said body between said station and the end of said body toward which the wave is propagated will cause a portion of the wave energy increased by the cross-sectional area reduction to be reflected at the defects, thus producing at the selected station a deformation which is indicated on said oscillograph record by an additional pulse located between the pulses indicating the deformations produced by the primary wave and the secondary wave reflected at said end, and the location of said defect between the selected station and said end of said body may be determined from a consideration of the position on said oscillograph pattern of said additional pulse relative to the pulses produced by the primary and reflected waves.

9. A method of determining the presence and location of defects in an elastic body which includes the steps of supporting said test body so that an elastic wave propagated therein will be substantially absorbed at the ends thereof thus permitting the wave to travel along said body only once, imparting an impulse to said body to set up in the body a primary elastic wave, and observing the pulses on an oscillograph record indicating the deformations produced in said body at at least two selected stations spaced along said body in the path of said wave, whereby the presence of a defect occurring in said body between the first selected station and the end of said body toward which said wave is propagated will cause at least a portion of the primary wave energy to be reflected at the defect, producing on the oscillograph pattern a number of pulses greater than the number of selected stations, and the location of said defect may be determined by noting the location of the observed pulses on the oscillograph record indicating the deformations in said body produced by the primary and reflected wave energy.

10. A method of determining the physical properties of an elastic body which includes the steps of supporting said elastic body so that an elastic wave may be propagated therein, periodically imparting a series of intermittent and substantially equal mechanical impulses to said body to set up in said body a succession of similar and non-interfering elastic waves and noting any abrupt diminution in amplitude of the wave propagated therein which would indicate the presence of an inhomogeneity occurring in said body along the path of the propagated wave.

11. A method of determining the physical properties of an elastic body which includes the steps of supporting a standard homogeneous body having known degrees of cold-working, annealing and/or fatigue so that an elastic wave may be propagated therein, periodically imparting a series of intermittent and substantially equal mechanical impulses to said body to set up in said body a succession of similar and non-interfering elastic waves, observing on an oscillograph record the diminution in amplitude of a single re-occurring wave, substituting for the standard body a test body, the physical properties of which are to be determined, periodically imparting to said test body a series of intermittent and substantially equal mechanical impulses having an amplitude and frequency equal to the mechanical impulses imparted to the standard elastic body, to set up in said test body a succession of similar and non-interfering waves having a period and amplitude equal to the elastic waves set up in said standard body and observing on an oscillograph record the diminution in amplitude of a single re-occurring wave, and comparing the diminution in amplitude between the waves propagated in said test body with the diminution in amplitude between waves propagated in said standard body to determine the relative internal friction of said bodies, whereby the difference in the state of fatigue, cold-working and/or the degree of annealing may be empirically determined.

ROSS GUNN.

REFERENCES CITED

The following references are of record in the file of this patent:

UNITED STATES PATENTS

| Number | Name | Date |
|---|---|---|
| 1,414,077 | Fessenden | Apr. 25, 1922 |
| 1,599,922 | Rathbone | Sept. 24, 1926 |

(Other references on following page)

UNITED STATES PATENTS

| Number | Name | Date |
|---|---|---|
| 1,635,787 | Hort | July 12, 1927 |
| 1,858,931 | Langevin et al. | May 17, 1932 |
| 1,948,104 | Firestone et al. | Feb. 20, 1934 |
| 1,979,225 | Hart | Oct. 30, 1934 |
| 1,990,085 | Mudge et al. | Feb. 5, 1935 |
| 2,105,479 | Hayes | Jan. 18, 1938 |
| 2,137,852 | Nicolson | Nov. 22, 1938 |
| 2,150,377 | Keinath | Mar. 14, 1939 |
| 2,164,125 | Sokoloff | June 27, 1939 |
| 2,172,395 | McSpadden | Sept. 12, 1939 |
| 2,193,079 | Schrader | Mar. 12, 1940 |
| 2,208,648 | Schrader | July 23, 1940 |
| 2,280,226 | Firestone | Apr. 21, 1942 |
| 2,299,425 | Peters | Oct. 20, 1942 |
| 2,316,253 | Keinath | Apr. 13, 1943 |
| 2,318,795 | Peters | May 11, 1943 |

FOREIGN PATENTS

| Number | Country | Date |
|---|---|---|
| 54,683 | Denmark | Apr. 12, 1940 |
| 163,048 | Switzerland | Oct. 16, 1933 |
| 779,262 | France | Jan. 10, 1935 |

OTHER REFERENCES

Ganot's Elementary Treatise on Physics, by Atkinson, 5th ed., 1898, published by Longmans, Green and Co., 39 Paternoster Row, London, pages 219–222.

Technical Information on Cathode Ray Tubes, etc., published by R. C. A. Radiotron Co., Inc.